United States Patent
Wu

(10) Patent No.: US 7,703,325 B2
(45) Date of Patent: Apr. 27, 2010

(54) METHOD FOR RELIEVING RESIDUAL STRESS IN AN OBJECT

(75) Inventor: Weite Wu, No. 5, Lane 110, Wen-Hsien Rd., Tainan City (TW)

(73) Assignee: Weite Wu, Tainan (TW)

( * ) Notice: Subject to any disclaimer, the term of this patent is extended or adjusted under 35 U.S.C. 154(b) by 199 days.

(21) Appl. No.: 11/844,800

(22) Filed: Aug. 24, 2007

(65) Prior Publication Data

US 2009/0049912 A1    Feb. 26, 2009

(51) Int. Cl.
*G01H 1/06* (2006.01)
*C21D 10/00* (2006.01)

(52) U.S. Cl. .................... 73/579; 148/558; 228/110.1

(58) Field of Classification Search ............ 73/579, 73/577; 148/558, 508; 228/110.1
See application file for complete search history.

(56) References Cited

U.S. PATENT DOCUMENTS

| | | | |
|---|---|---|---|
| 3,622,404 A * | 11/1971 | Thompson ............ | 148/558 |
| 4,968,359 A * | 11/1990 | Hebel et al. ........... | 148/558 |
| 5,242,512 A * | 9/1993 | Bagley et al. ......... | 148/558 |
| 6,023,975 A * | 2/2000 | Willis .................... | 73/579 |
| 6,116,088 A * | 9/2000 | Schneider et al. .... | 73/579 |
| 6,159,315 A * | 12/2000 | Haszler et al. ........ | 148/697 |
| 7,175,722 B2 * | 2/2007 | Walker .................. | 148/558 |
| 7,431,193 B2 * | 10/2008 | Iordache et al. ...... | 228/110.1 |
| 7,431,779 B2 * | 10/2008 | Statnikov ............... | 148/400 |
| 7,549,336 B2 * | 6/2009 | Masyada ................ | 73/579 |

* cited by examiner

*Primary Examiner*—J M Saint Surin
(74) *Attorney, Agent, or Firm*—DLA Piper LLP (US)

(57) ABSTRACT

A method for relieving residual stress in an object includes: (a) applying a vibration energy to the object over a frequency range; (b) monitoring vibration behavior of the object over the frequency range so as to identify a reference frequency, where the vibration amplitude of a fundamental wave component of the wave pattern is approximately one third of a maximum vibration amplitude of a resonate frequency of the object, and an optimum frequency, where the frequency and the vibration amplitude of the harmonic wave component of the wave pattern are respectively larger than those of the harmonic wave component of the wave pattern of the reference frequency; and (c) applying the vibration energy to the object at the identified optimum frequency for an extended period of time.

1 Claim, 7 Drawing Sheets

METHOD FOR RELIEVING RESIDUAL STRESS IN AN OBJECT

BACKGROUND OF THE INVENTION

1. Field of the Invention

This invention relates to a method for relieving residual stress in an object, more particularly to a method using a vibration energy for relieving residual stress in an object.

2. Description of the Related Art

It is known in the art that the internal residual stress of an object can be relieved by applying a vibration energy thereto using a vibrator and that the internal residual stress is not directly relieved by the operating frequencies of the vibrator, but by excited harmonic vibrations of the metal object.

U.S. Pat. No. 4,823,599 discloses a method of operating a vibrator for the stress relief of a workpiece. The method includes the steps of determining, within a defined harmonics region, harmonics corresponding to those vibrations in an operating range in which resonances or similar stable states of vibration occur, and selecting a vibration speed, that causes the higher numbers of harmonics in the defined harmonics region, as the operating speed for the vibrator.

U.S. Pat. No. 4,968,359 discloses a method of stress relieving in metal objects. The method includes the steps of: applying a mechanical cyclic vibration energy to the metal object; identifying a plurality of orders of harmonic vibration absorption peaks, each consisting of a plurality of vibration absorption resonant peaks; and applying the mechanical cyclic vibration energy to the metal object for an extended period of time at a fixed frequency corresponding to a sub-harmonic frequency of one of the harmonic peaks. The sub-harmonic frequency associated with a particular order of the harmonics corresponds to a vibration amplitude equal to approximately one third of maximum vibration amplitude of the particular order.

SUMMARY OF THE INVENTION

The object of the present invention is to provide a stress relieving method that can improve relief of the residual stress in an object as compared to the prior art.

According to this invention, there is provided a method for relieving residual stress in an object that exhibits different vibration wave patterns at different vibratory frequencies of a vibrator applied thereto. Each of the wave patterns is composed of a fundamental wave component and a harmonic component having a frequency higher than that of the fundamental wave component. The object has a resonate frequency, at which the object is forced into resonance vibration and at which the object exhibits a maximum vibration amplitude over frequencies other than the resonate frequency. The method comprises: (a) applying a vibration energy to the object over a test vibratory frequency range using the vibrator; (b) monitoring vibration behavior of the object over the test vibratory frequency range so as to identify a reference frequency, where the vibration amplitude of the fundamental wave component of the vibration wave pattern is approximately one third of the maximum vibration amplitude of the resonate frequency, and an optimum frequency, where the frequency and the vibration amplitude of the harmonic wave component of the vibration wave pattern are respectively larger than those of the harmonic wave component of the vibration wave pattern of the reference frequency; and (c) applying the vibration energy to the object at the identified optimum frequency for an extended period of time.

BRIEF DESCRIPTION OF THE DRAWING

Other features and advantages of the present invention will become apparent in the following detailed description of the preferred embodiment of this invention, with reference to the accompanying drawing, in which.

DETAILED DESCRIPTION OF THE PREFERRED EMBODIMENT

Figure 1:
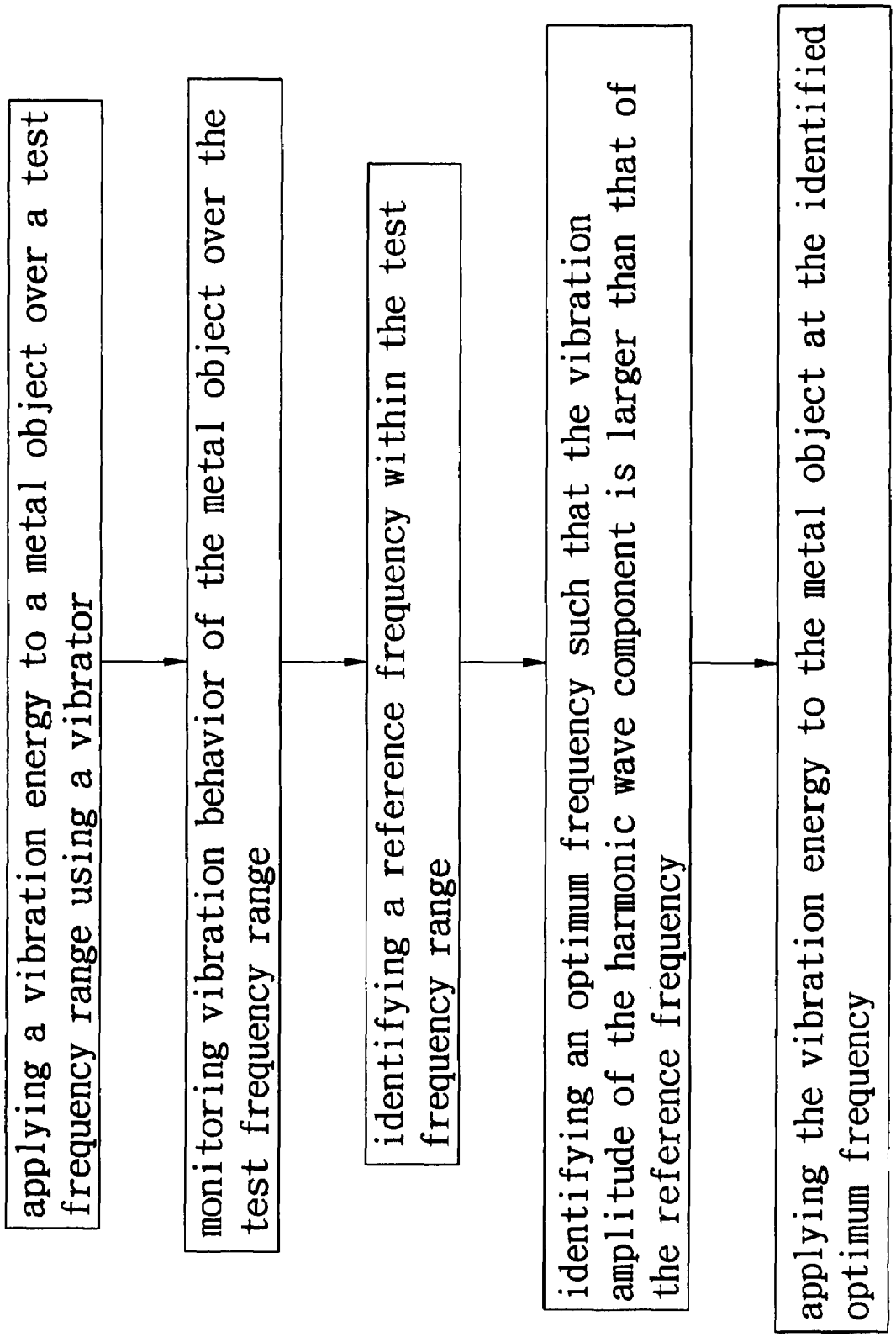
FIG. 1 is a flow chart of the preferred embodiment of a method for relieving residual stress in an object according to this invention.

FIG. 1 illustrates consecutive steps of the preferred embodiment of a method for relieving residual stress in an object 2 (see FIG. 2), such as a metal object, according to this invention. As an example, the object 2 referred hereinafter is a metal object. The metal object 2 exhibits different vibration wave patterns at different vibratory frequencies of a vibrator 11 (see FIG. 2) applied thereto. Each of the wave patterns is composed of a fundamental wave component and a harmonic component having a frequency higher than that of the fundamental wave component. The metal object 2 has a resonate frequency (see FIG. 3), at which the metal object 2 is forced into resonance vibration and at which the metal object 2 exhibits a maximum vibration amplitude over frequencies other than the resonate frequency. The method includes the steps of: (a) applying a vibration energy to the metal object 2 over a test vibratory frequency range using the vibrator 11; (b) monitoring vibration behavior of the metal object 2 over the test vibratory frequency range using an accelerometer 12 and an oscilloscope 13 so as to identify a reference frequency (see FIG. 4), where the vibration amplitude of the fundamental wave component (not shown) of the vibration wave pattern is approximately one third of the maximum vibration amplitude of the resonate frequency, and an optimum frequency (see FIG. 5), where the frequency and the vibration amplitude of the harmonic wave component (see FIG. 7) of the vibration wave pattern are respectively larger than those of the harmonic wave component (see FIG. 6) of the vibration wave pattern of the reference frequency; and (c) applying the vibration energy to the metal object 2 at the identified optimum frequency for an extended period of time.

The applicant found that the larger the vibration amplitude of the harmonic wave component of a vibration wave pattern produced by applying a vibratory frequency to the metal object 2, the larger will be the extent of reduction of the residual stress in the metal object 2. Preferably, the vibration amplitude of the harmonic wave component of the vibration wave pattern of the optimum frequency in step (b) is at least two times larger than that of the harmonic wave component of the vibration wave pattern of the reference frequency. More particularly, the harmonic wave component of the vibration wave pattern in step (b) exhibits a maximum vibration amplitude at the optimum frequency over other test frequencies within the test vibratory frequency range.

The merits of the method of this invention will become apparent with reference to the following Example and Comparative Examples.

For the sake of brevity, the metal object 2 is operated at "A" mode when it is subjected to a vibratory frequency corresponding to the resonate frequency, "B" mode when it is subjected to the reference frequency, and "C" mode when it is subjected to the optimum frequency.

Figure 2:
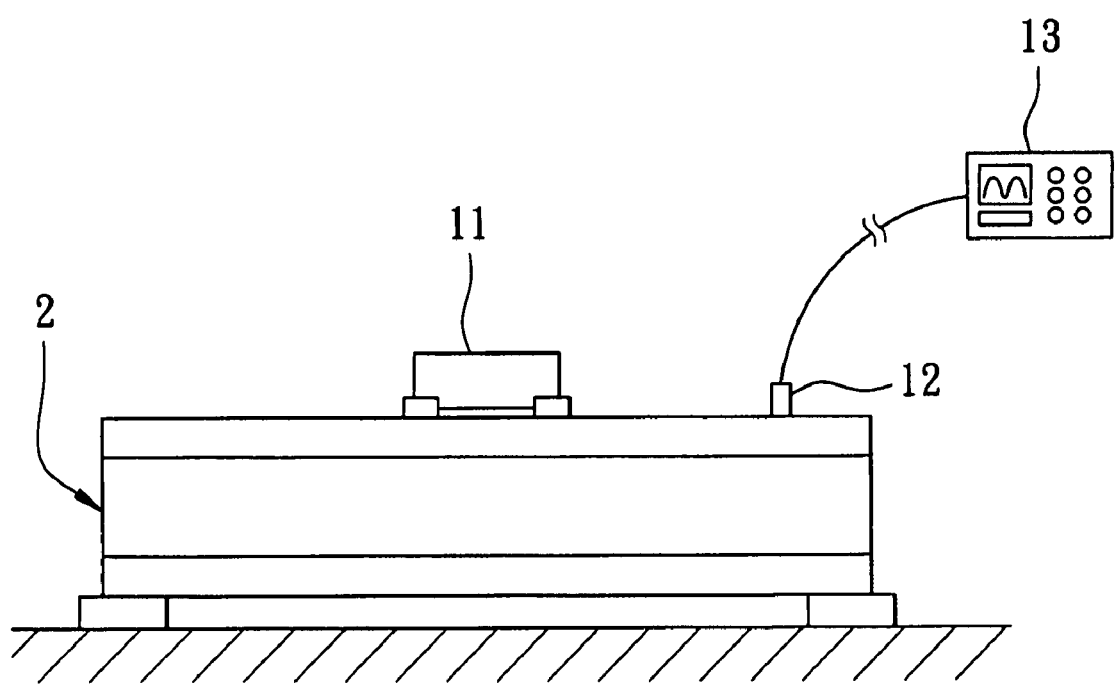
FIG. 2 is a schematic view to illustrate how the metal object is excited to vibrate using a vibrator according to the method of this invention.

Three test specimens of low alloy steel were subjected to stress relief annealing and welding, and were subsequently subjected to the vibratory vibrations using the system shown in FIG. 2, and were operated at the "A", "B", and "C" modes, respectively. The input vibratory frequencies of the vibrator 11 for operating at "A", "B", and "C" modes were 47.8 Hz, 40.1 Hz, and 45 Hz, respectively. Example 1 was operated at Mode "C". Comparative Examples 1 and 2 were operated at Modes "A" and "B", respectively.

Figure 3:
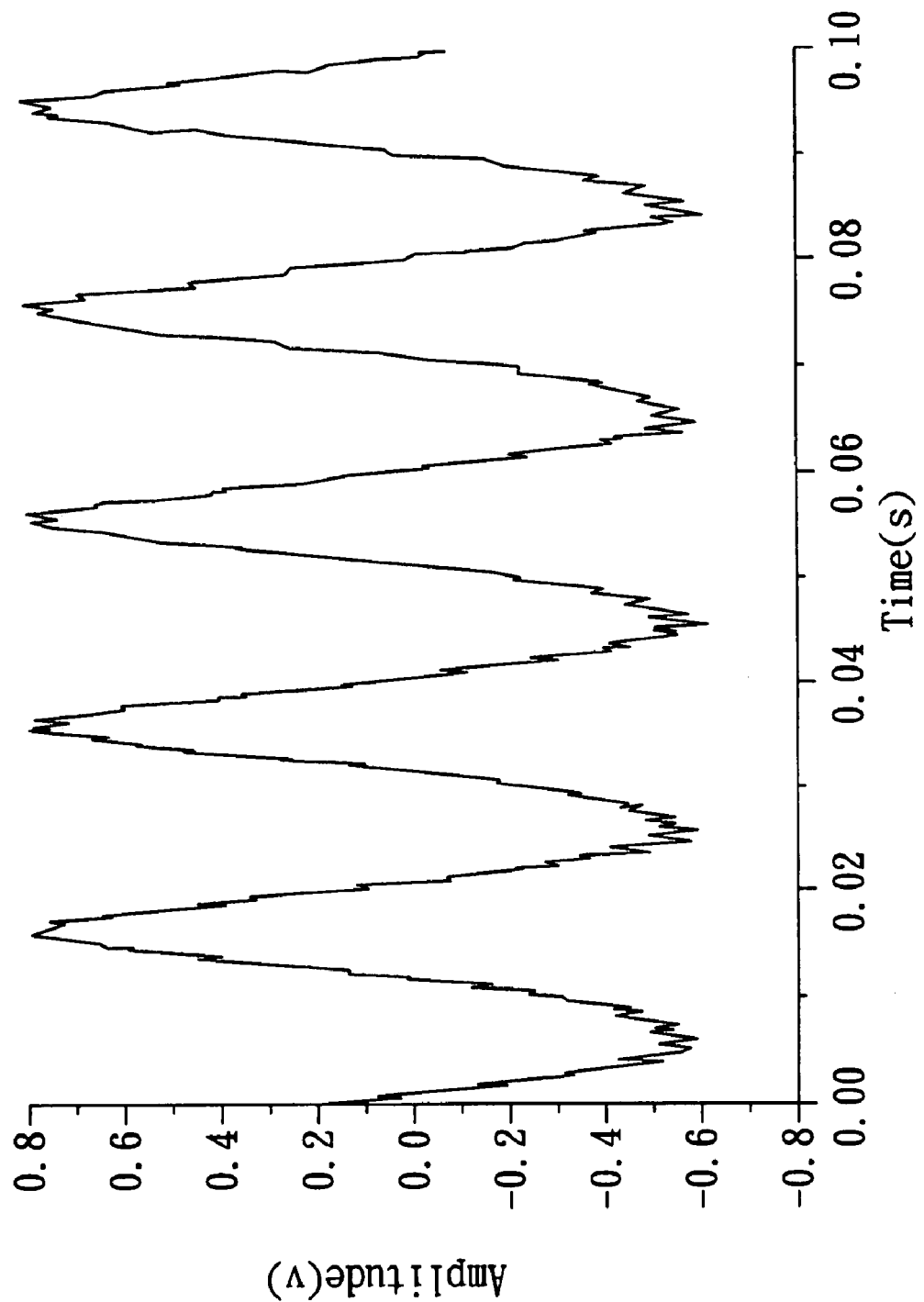
FIG. 3 is a plot illustrating frequency response of the metal object excited at a vibratory resonate frequency.
Figure 4:
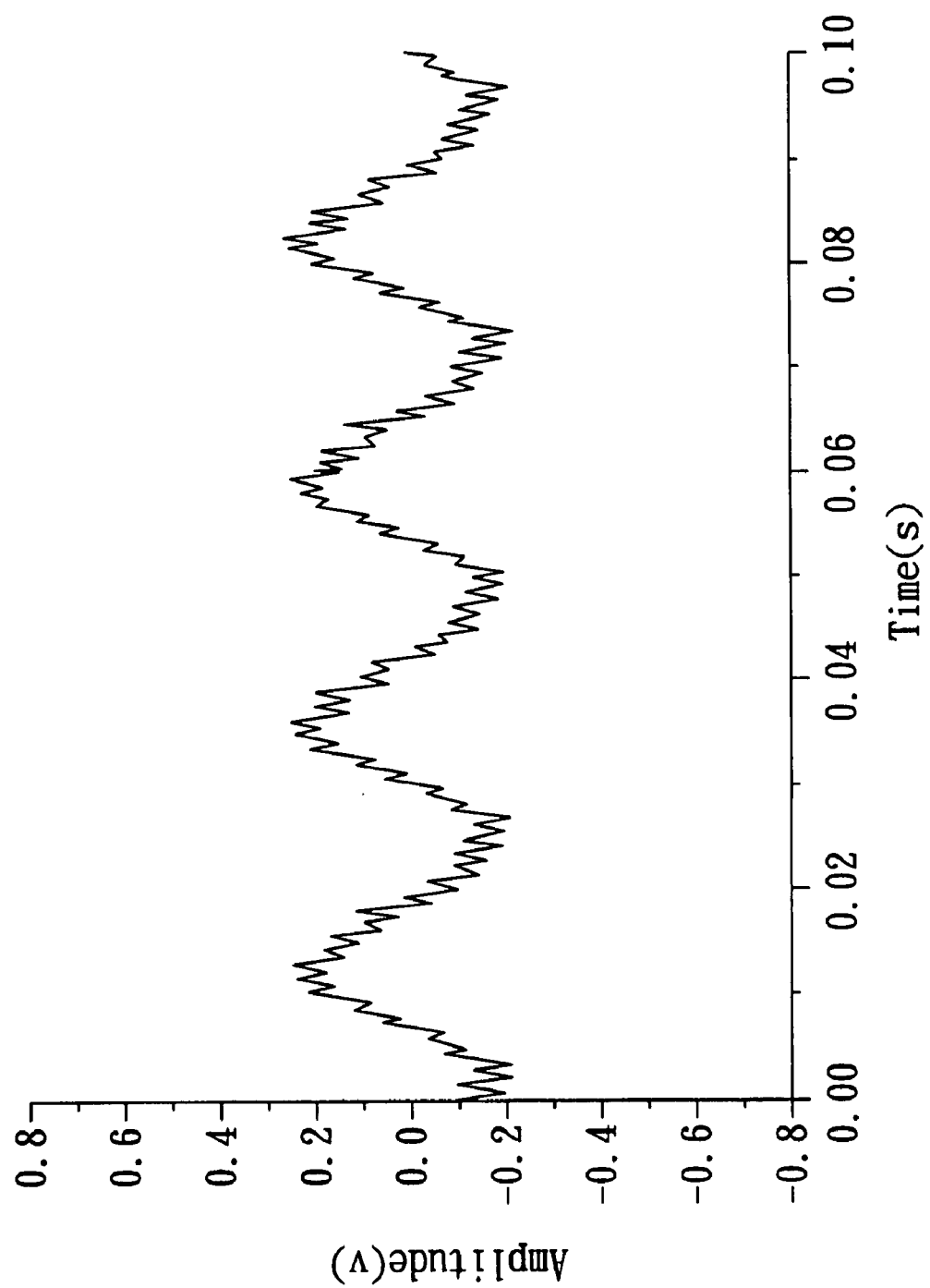
FIG. 4 is a plot illustrating frequency response of the metal object excited at a reference frequency.
Figure 5:
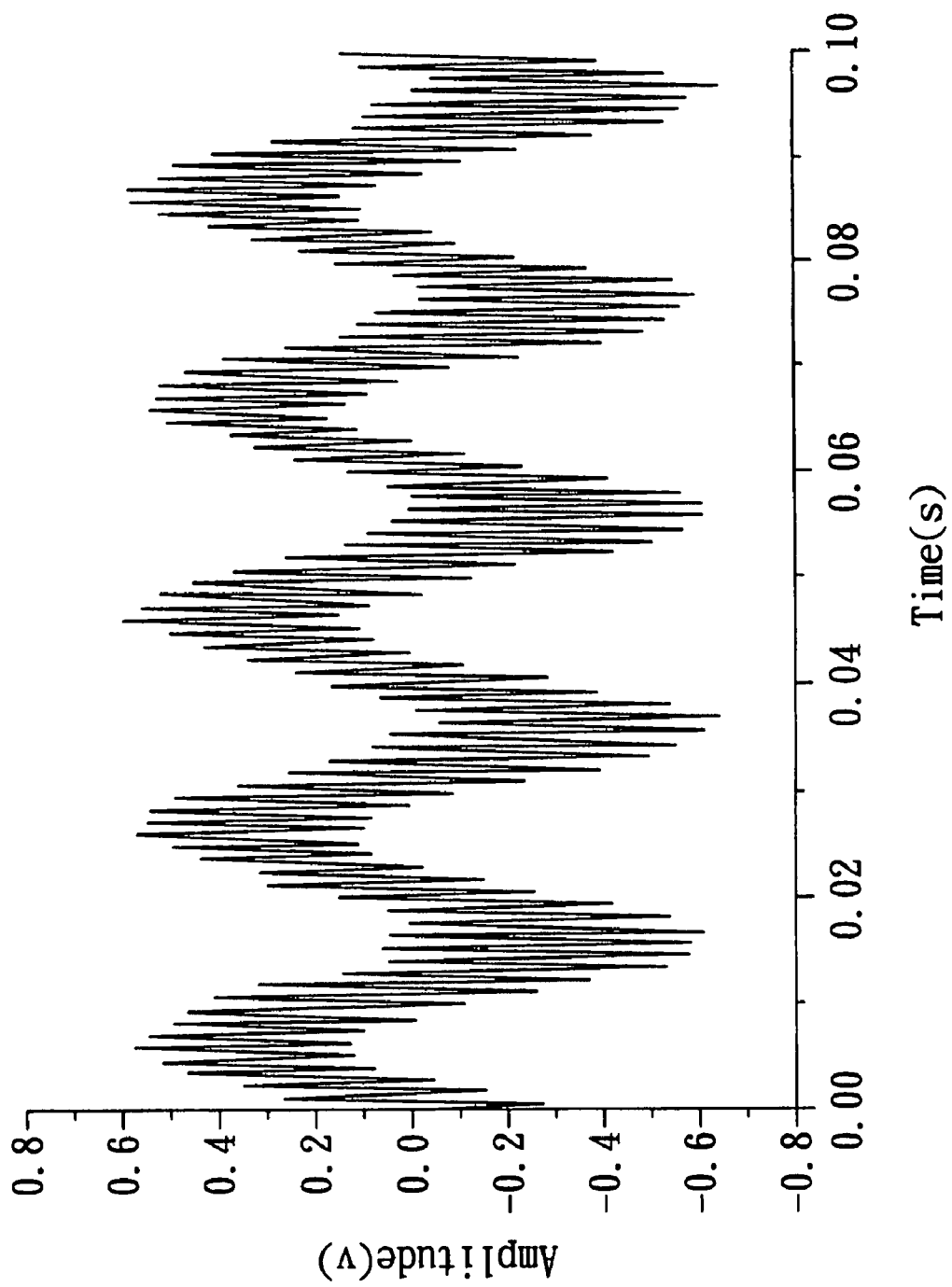
FIG. 5 is a plot illustrating frequency response of the metal object excited at an optimum frequency according to the method of this invention.
Figure 6:
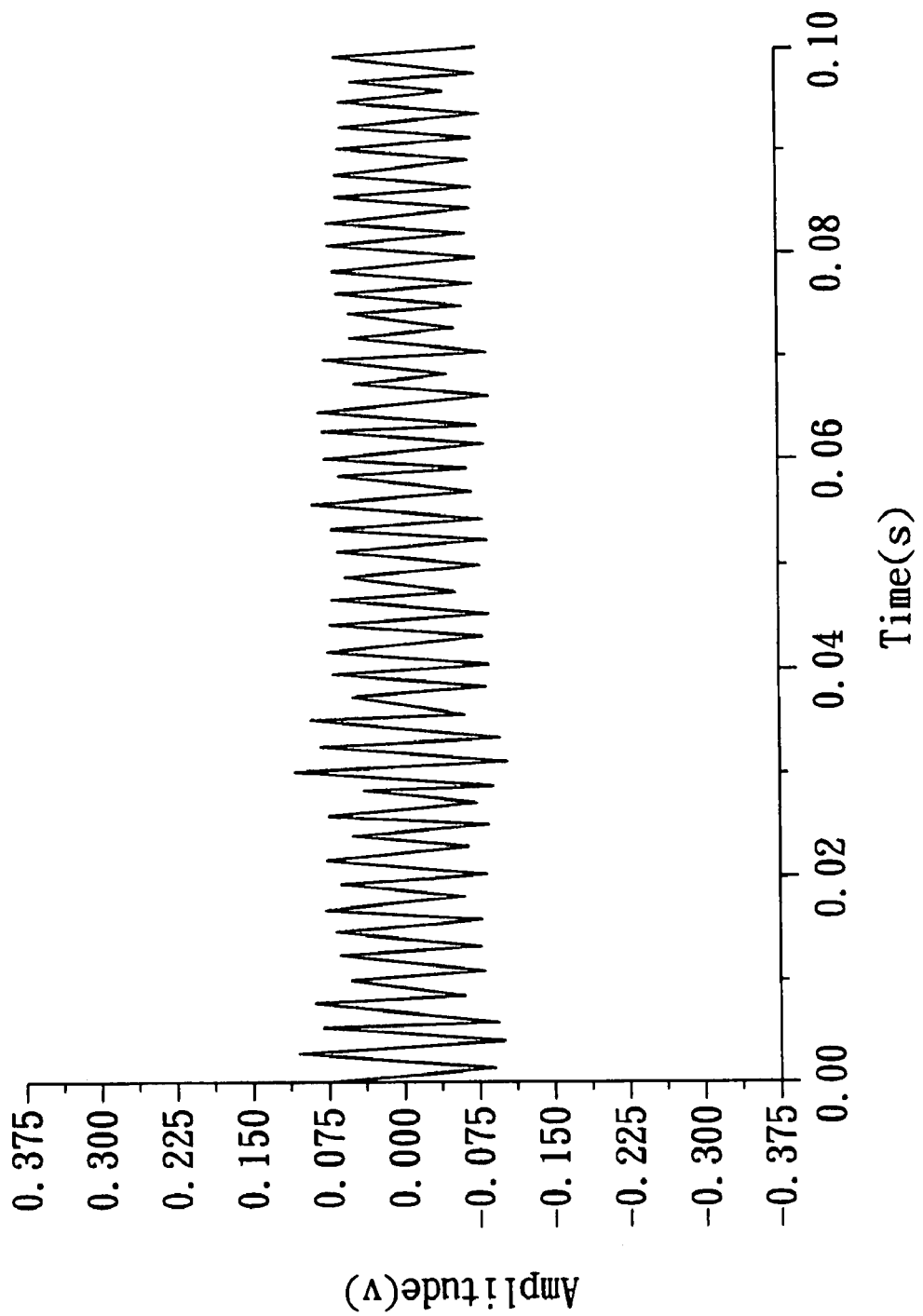
FIG. 6 is a plot to illustrate a harmonic wave component of the wave pattern of FIG. 4.
Figure 7:
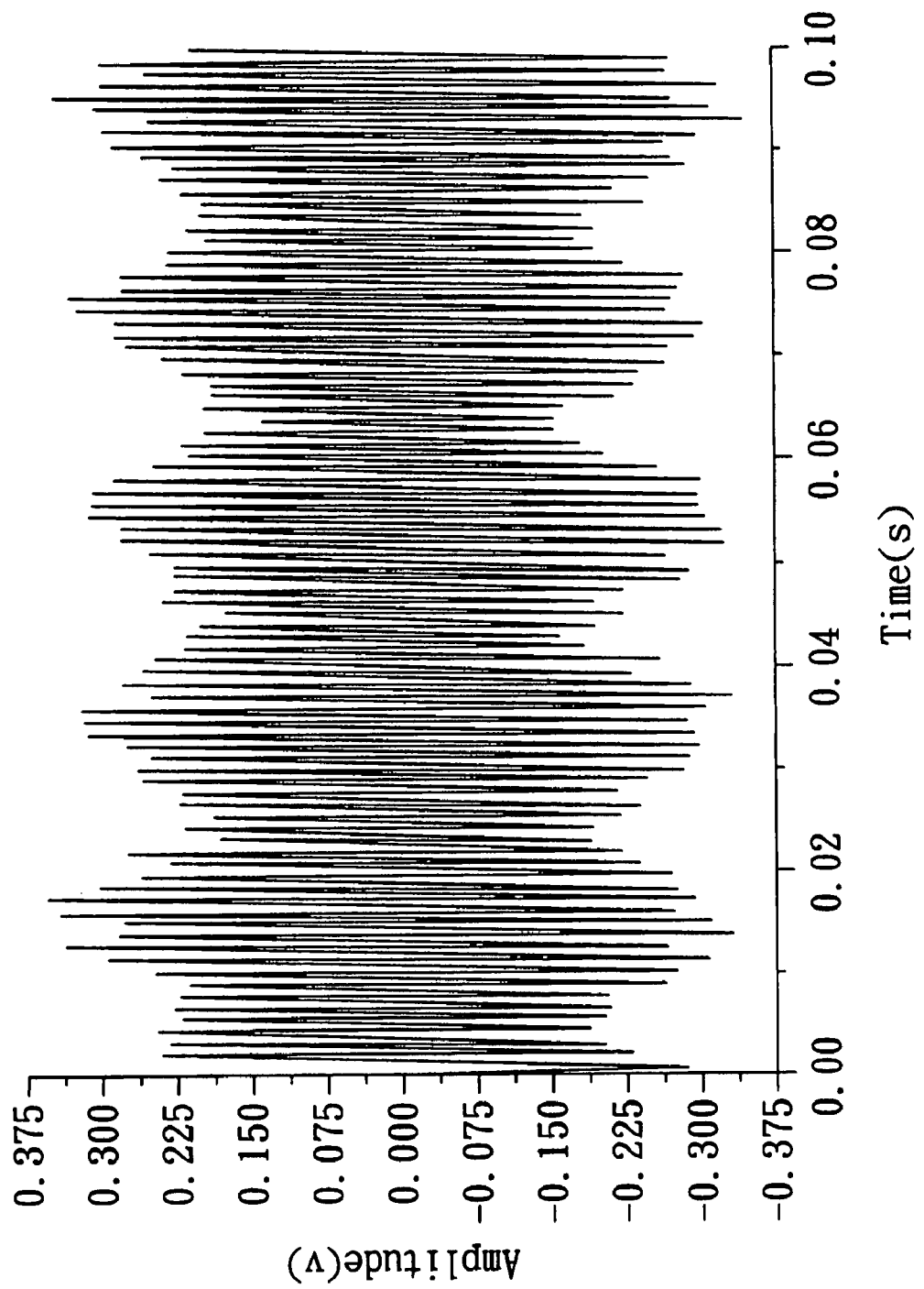
FIG. 7 is a plot to illustrate a harmonic wave component of the wave pattern of FIG. 5.

FIG. 3 is the frequency response of Comparative Example 1 which was operated at a substantial resonate frequency. The vibration amplitude of the vibration wave pattern of FIG. 3 is substantially equal to the maximum vibration amplitude of the true resonate frequency of the respective test specimen. FIG. 4 is the frequency response of Comparative Example 2. FIG. 6 is the harmonic wave component of the vibration wave pattern of FIG. 4, which has a vibration amplitude equal to about one third of the maximum vibration amplitude of the vibration wave pattern of FIG. 3. FIG. 5 is the frequency response of Example 1. FIG. 7 is the harmonic wave component of the vibration wave pattern of FIG. 5, which has a vibration amplitude about three to four times larger than that of the harmonic wave component shown in FIG. 6, and a frequency about two times larger than that of the harmonic wave component shown in FIG. 6. Table 1 shows the test results of Example 1 and Comparative Examples 1 and 2.

TABLE 1

|  | Residual stress before vibratory treatment | Residual stress after vibratory treatment | Residual stress difference | Stress reduction percentage % |
| --- | --- | --- | --- | --- |
| Comparative Example 1 | 327 | 234 | 93 | 28.4% |
| Comparative Example 2 | 350 | 230 | 120 | 34.3% |
| Example 1 | 343 | 208 | 135 | 39.3% |

The test results show that by operating at the optimum frequency according to the method of this invention, the residual stress in the metal object 2 can be considerably reduced as compared to the aforesaid conventional method that is operated at the reference frequency.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A method for relieving residual stress in an object, comprising:
    (a) applying a vibration energy to the object over a test vibratory frequency range using a vibrator;
    (b) monitoring a vibration wave pattern of the object that varies over the test vibratory frequency range, the vibration wave pattern being composed of a fundamental wave component and a harmonic wave component that has a frequency higher than that of the fundamental wave component and that depends on the fundamental wave component;
    (c) identifying an optimum frequency where the harmonic wave component of the vibration wave pattern exhibits a maximum vibration amplitude compared to the vibration amplitudes of the harmonic wave components generated at all other frequencies within the test vibratory frequency range; and
    (d) applying the vibration energy to the object at the identified optimum frequency for an extended period of time.

* * * * *